(12) United States Patent
Kimberley

(10) Patent No.: US 6,739,390 B1
(45) Date of Patent: May 25, 2004

(54) ARTICULATED SEAL

(76) Inventor: Kevin Kimberley, c/o 9112 40th Street SE., Calgary, Alberta (CA), T2C 2P3

( * ) Notice: Subject to any disclaimer, the term of this patent is extended or adjusted under 35 U.S.C. 154(b) by 13 days.

(21) Appl. No.: 10/229,764

(22) Filed: Aug. 27, 2002

(51) Int. Cl.[7] .............................................. E21B 19/00
(52) U.S. Cl. ................................ 166/84.1; 417/423.12; 403/51; 277/329
(58) Field of Search ........................... 166/84.1; 403/50, 403/51; 417/423.12; 277/322, 323, 328, 329

(56) References Cited

U.S. PATENT DOCUMENTS

| | | | |
|---|---|---|---|
| 4,907,650 A | * 3/1990 | Heinonen | 166/80.1 |
| 5,415,531 A | * 5/1995 | Cavanaugh | 417/397 |
| 5,655,778 A | * 8/1997 | Cavanaugh | 277/315 |
| 6,167,959 B1 | * 1/2001 | Bassinger et al. | 166/84.2 |
| 6,371,487 B1 | * 4/2002 | Cimbura, Sr. | 277/322 |

* cited by examiner

*Primary Examiner*—Roger Schoeppel
(74) *Attorney, Agent, or Firm*—Blakely, Sokoloff, Taylor & Zafman LLP

(57) ABSTRACT

An articulated seal for use with polished rod and rotary drive head assemblies is described. In particular, an articulated seal assembly or system 10 is described which seals a rotating drive head and polished rod between high pressure internal fluids within a well 12 and the exterior while absorbing the normal wobble motion of a rotating polished rod.

14 Claims, 3 Drawing Sheets

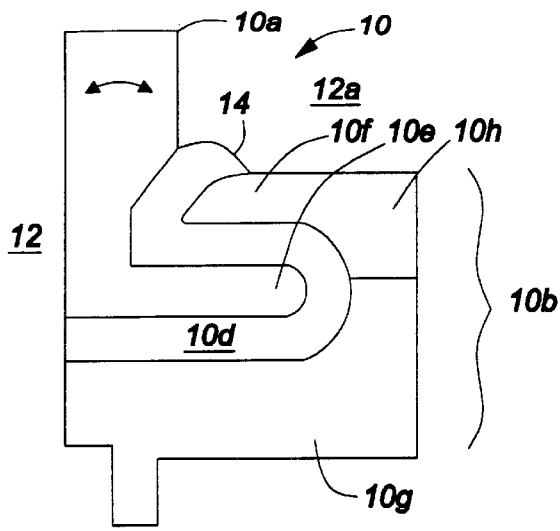
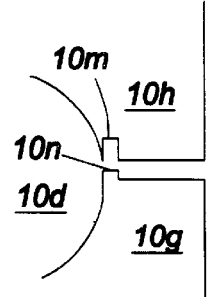
FIG. 2  FIG. 2A
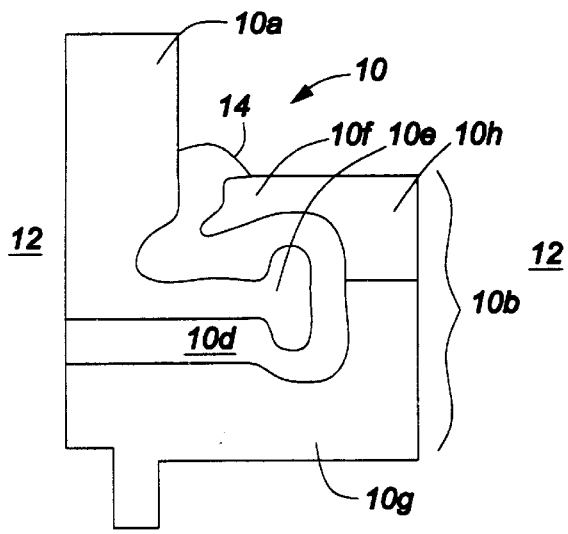
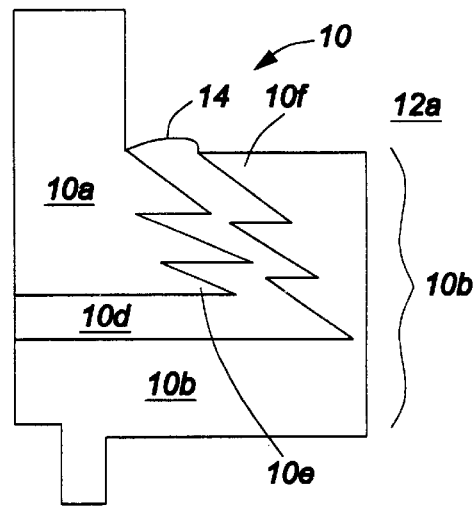
FIG. 3  FIG. 4

ARTICULATED SEAL

FIELD OF THE INVENTION

An articulated seal for use with polished rod and a standard packing and/or rotary drive head assemblies is described. In particular, an articulated seal assembly or system is described which seals a rotating polished rod between high pressure internal fluids within a well and the exterior while absorbing the normal wobble motion of a rotating polished rod.

BACKGROUND OF THE INVENTION

The use of a polished rod and rod string for pumping production wells is known wherein a polished rod and rod string is rotated within the tubing string of the well in order to pump oil from the well. As the polished rod is rotated by a motor at the well-head, the shaft of the polished rod must be provided with a seal system to ensure that high pressure fluids from within the well do not leak or escape at the well-head. In addition, the seal system must also prevent leaks during periods of no rotation.

In the past, various rotary seals have been incorporated into production wells to prevent both static and dynamic leakage during periods of rotation and non-rotation. In addition to basic rotation seals, advanced sealing systems have also been developed which have incorporated additional functionality within the seals including systems which absorb wobble (defined as a dynamic run-out of the polish rod) in the polished rod and the detrimental effect of that wobble on the integrity of the seals.

For example, Applicants U.S. patent application 09/433,687 describes a gimbal seal for absorbing polished rod wobble through the use of a ball and socket joint and rubber seals which allow wobble forces to be absorbed while maintaining a seal. While this design of seal was demonstrated as effective in the short-term, the long term effectiveness of this design provided non-optimal results. Accordingly, there continues to be a need for seal systems for rotating polished rods which provide a seal for both the rotational and wobble motion of a rotating polished rod within either a standard packing assembly or a rotating seal assembly and which also are effective in providing sealing during non-rotation.

SUMMARY OF THE INVENTION

In accordance with the invention, there is provided an articulated seal system comprising:
  upper and lower seal supporting elements, the upper and lower seal supporting elements having respective overlapping flanges, the overlapping flanges defining a void; and
  a resiliently flexible seal within the void.

In a further embodiment, the invention provides a method of assembling an articulated seal system having upper and lower seal supporting elements having respective overlapping flanges, the overlapping flanges defining a void, comprising the steps of:
  (a) inserting the overlapping flange of either of the upper or lower seal supporting elements into the overlapping flange of the opposing element;
  (b) stabilizing the upper and lower seal supporting elements with respect to one another; and
  (c) injecting an un-cured sealing agent into the void and allowing the sealing agent to cure.

In a still further and more specific embodiment, there is provided an articulated seal system for sealing between the interior and exterior of a well comprising:
  a lower seal supporting element having an inwardly projecting flange;
  an upper seal supporting element having an outwardly projecting flange overlapping with the inwardly projecting flange wherein the inwardly and outwardly projecting flanges define an s-shaped void having curved surfaces between the interior and exterior of the articulated seal system; and,
  a resiliently flexible seal bonded to the curved surfaces of the void.

In a still further embodiment, the invention provides a seal assembly for use at a wellhead, the wellhead having a rotating drivehead operatively connected to a rotating inner sleeve and a polished rod, the seal assembly comprising:
  a lower seal assembly for sealing between the rotating inner sleeve and a stationary mount;
  a bearing assembly operatively connected between the rotating inner sleeve and the stationary mount;
  an articulated seal operatively connected to the rotating inner sleeve, the articulated seal having upper and lower seal supporting elements, the upper and lower seal supporting elements having respective overlapping flanges, the overlapping flanges defining a void; and a resiliently flexible seal within the void; and
  a top seal assembly for sealing between the polished rod and the exterior of the wellhead.

BRIEF DESCRIPTION OF THE DRAWINGS

The invention will now be described by the following description and drawings wherein:

FIG. 2 is a schematic axial cross-section of an articulated seal having inwardly and outwardly projecting flanges in accordance with one embodiment of the invention;

FIG. 2A is a schematic axial cross-section of an articulated seal showing a mating flange and recess in accordance with one embodiment of the invention;

FIG. 3 is a schematic axial cross-section of an articulated seal having inwardly and outwardly projecting flanges in accordance with another embodiment of the invention;

FIG. 4 is a schematic axial cross-section of an articulated seal having inwardly and outwardly projecting flanges in accordance with a still further embodiment of the invention; and, FIG. 5 is a schematic axial cross-section of an articulated seal for use in a non-rotating packing assembly where the packing forms a dynamic seal in accordance with a still further embodiment of the invention.

DETAILED DESCRIPTION OF THE INVENTION

Figure 1:
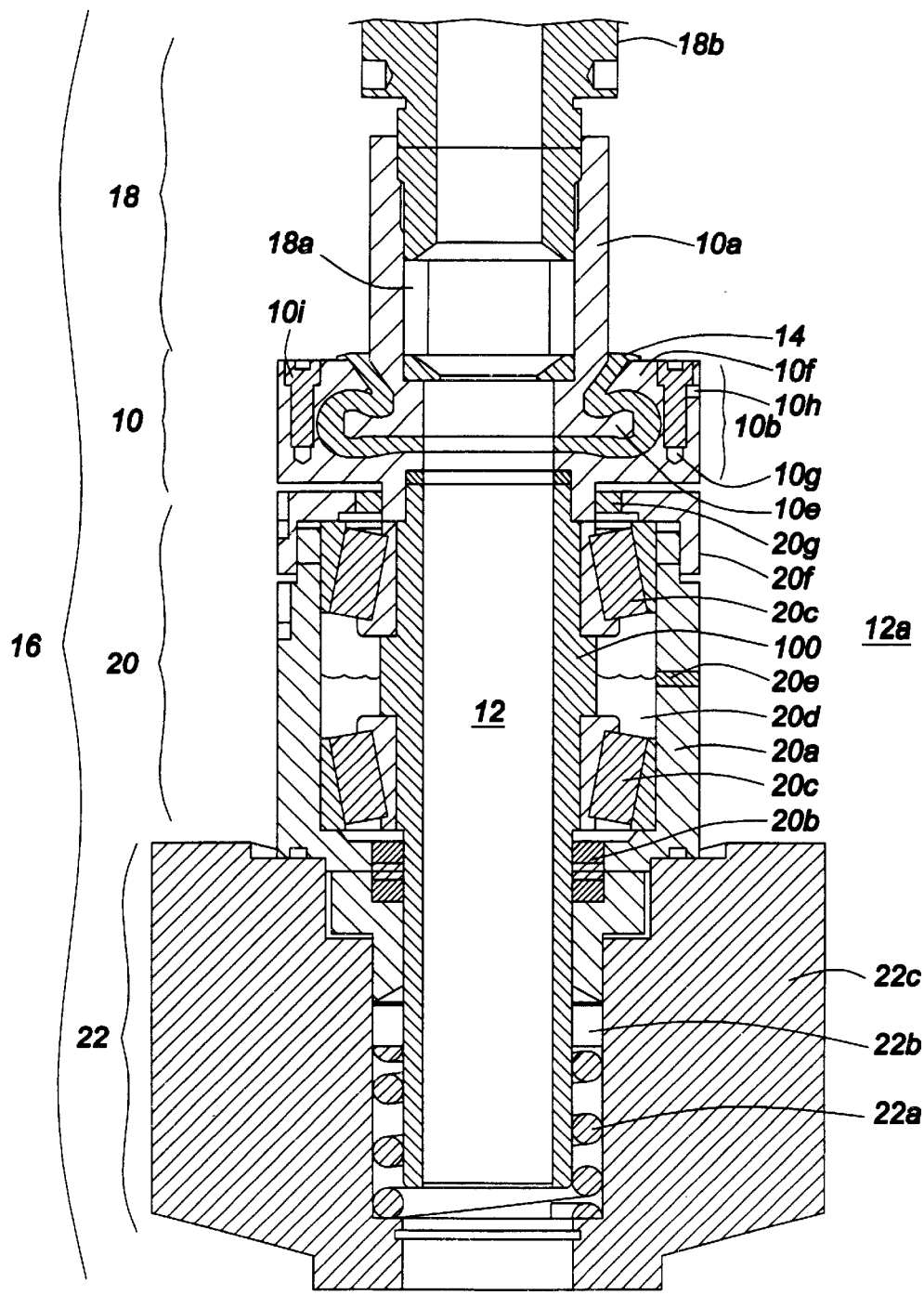
FIG. 1 is an axial cross-section of an articulated seal, drivehead seal and bearing assembly in accordance with the invention.
Figure 5:
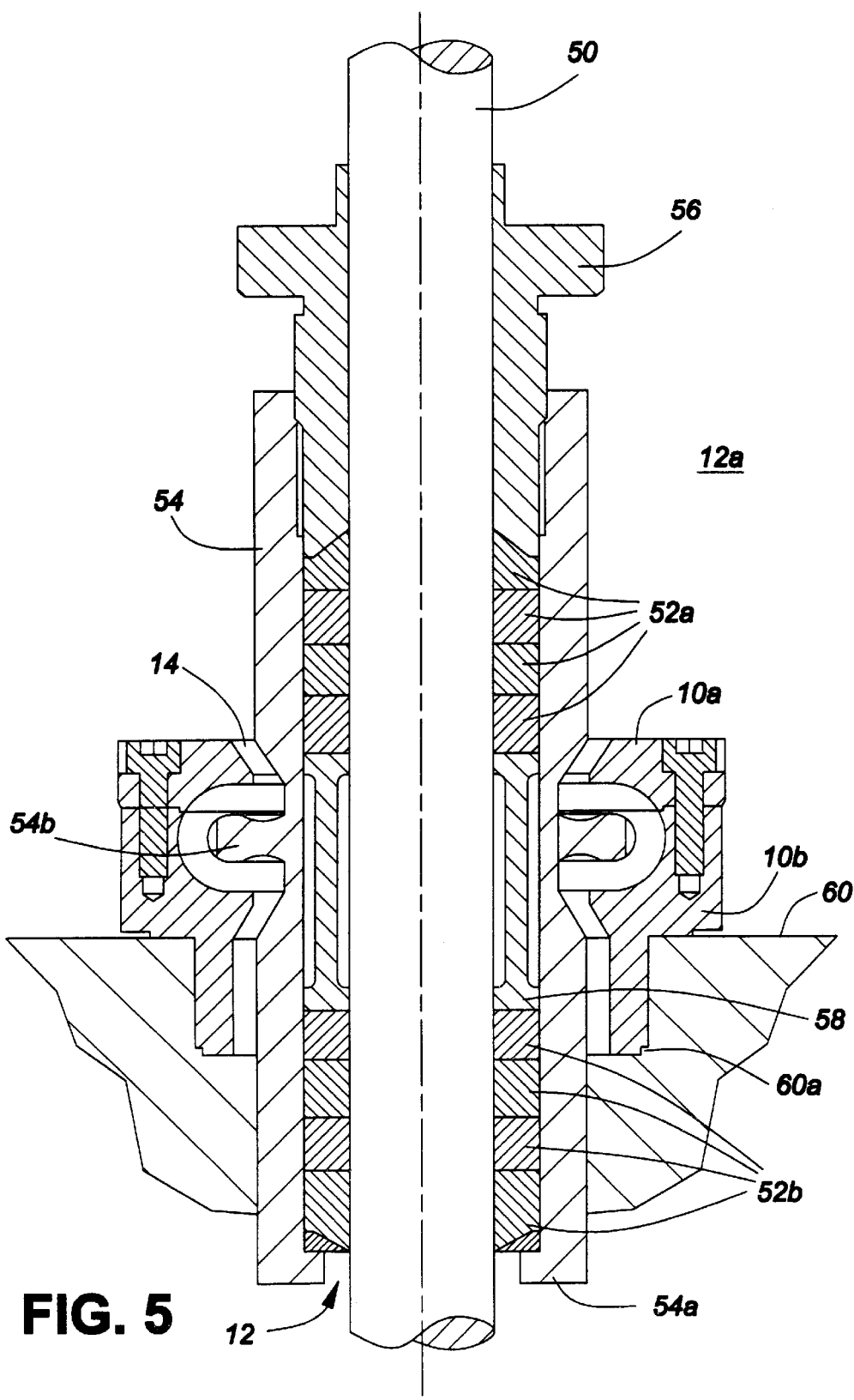

With reference to the Figures, an articulated seal assembly or system 10 for use with polished rod is described. FIG. 1 shows an embodiment for use with a rotating drive head assembly and FIG. 5 shows an embodiment with a standard non-rotating packing assembly. In particular, an articulated seal assembly or system 10 is described that absorbs wobble and seals a polished rod between high pressure internal fluids within a well 12 and the exterior 12a. The system 10 is effective in sealing and absorbing wobble both when the polished rod is stationary (i.e. non-rotating) or rotating.

In the embodiment shown in FIG. 1, the articulated seal system 10 is integrated into a rod rotation and holding assembly 16 including a top seal assembly 18, the articulated seal system 10, a bearing system 20 and a lower seal assembly 22.

With reference to FIGS. 1–4, the articulated seal system 10 generally includes upper 10a and lower 10b elements separated by a semi-rigid seal 14.

As shown, the upper and lower elements 10a, 10b are designed to define a void 10d (see FIGS. 2–4) having a tortuous pathway between the interior 12 and the exterior 12a of the system 10. The semi-rigid seal 14 fills the void 10d between the upper 10a and lower 10b elements and is in intimate contact with the inner surfaces of the upper 10a and lower 10b elements as defined by the void 10d.

In a preferred embodiment, the semi-rigid seal 14 is a suitable elastomer sealing compound which is compression molded into the void 10d. Molding of an elastomer compound followed by curing ensures conformity to the shape of the void and that the seal is in intimate contact with all the inner surfaces of the void. The elastomeric nature of the seal ensures that a degree of flexure between the upper 10a and lower 10b elements can occur to absorb wobble vibrations or motion of the drive head.

The tortuous pathway of void 10d between the upper and lower elements is generally defined by overlapping flanges 10e, 10f of the upper and lower elements. As shown in FIGS. 1 and 2, the upper element 10a has a lower region with at least one outwardly projecting flange 10e and the lower element 10b has an upper region with at least one inwardly projecting flange 10f. The at least one inwardly projecting flange 10f overlaps with the at least one outwardly projecting flange 10e of the upper element 10a.

As shown in FIGS. 1–3, it is preferred that the flanges 10e, 10f of the upper and lower elements 10a, 10b are provided with curved surfaces to reduce surface stresses in the seal 14 during use and thereby minimize the risk of damage to the seal 14. Furthermore, during use and by virtue of the overlapping flanges, if the top element 10a tilts with respect to the lower element, as pressure is reduced on one region of the seal, a corresponding increase in pressure is realized on an opposing region of the seal thereby ensuring seal integrity.

The articulated seal system 10 is assembled by inserting the outwardly projecting flanges 10e of the upper element 10a into the lower element 10b. The lower element 10b includes two components to enable assembly of the upper and lower elements. As shown in FIGS. 1 and 2, the lower element includes a base element 10g and a cap element 10h. In this embodiment, during assembly, the cap element 10h is removed and the upper element 10a is placed and positioned over the base element 10g. The cap element 10h is then placed over both the base element 10b and upper element 10a and secured to the base element 10g. The cap element 10h may be secured to the base element 10g by an appropriate connection system such as a bolt 10i as shown in FIG. 1, or another connection system such as screws, a threaded connection or separate clamping element as understood by those skilled in the art.

After assembly of the upper 10a and lower 10b elements, the upper 10a and lower 10b elements are secured in a jig and an elastomeric compound is compression molded into the void 10d and subsequently cured to become the semi-rigid seal 14. Preferably, the sealing compound is an elastomer such as a butadiene-acrylonitrile which will bond to the surfaces of the void. In particular, a synthetic rubber may be used in conjunction with a glue which upon heating will bond the rubber and glue to the surfaces of the upper and lower elements. During assembly, the upper and lower elements may be partially separated from one another so as to create a marginally larger volume for receiving the elastomer. After curing, the upper and lower elements may be tightened so as to create a compressive load against the elastomer in order to assist in preventing separation of the elastomer from the surfaces of the void. In this case, the upper and lower elements may be provided with appropriate overlapping flanges 10n and recess 10m, or an equivalent system as shown in FIG. 2A that would prevent seepage of uncured elastomer between the surface of the upper and lower elements when in the marginally separated position.

In other embodiments, the semi-rigid seal 14 may be pre-formed from a mold and assembled with the upper 10a and lower elements 10b. Pre-formed seals may permit replacement of the seal in the field.

In another embodiment, as shown schematically in FIGS. 3 and 4, the articulated seal system 10 may include more than one flange (FIG. 4) or may provide a void 10d having multiple turns (FIGS. 2 and 3) which lengthen the void pathway between the interior and exterior of the seal 10.

Still further, while the articulated seal has been described in relation to the outwardly projecting flange being located on the upper element, it is understood that the location of the inwardly and outwardly projecting flanges may be located on either of the upper or lower elements.

In use and as described generally above, the articulated seal is used in conjunction with various sub-assemblies which make up a drivehead assembly. As shown in FIG. 1, the articulated seal 10 forms a component of a top seal assembly 18 mounted on a bearing assembly 20 and on a lower seal assembly 22 which in combination allow liner 100 to rotate while sealing the interior of the well from the exterior and preventing contamination of the bearing assembly 20.

The bottom seal assembly 22 provides a first seal to the bearing assembly 20 against particulate matter such as sand and other rock debris. The lower seal assembly 22 includes spring element 22a which biases a dynamic seal 22b against the non-rotating bearing mount 20a of the bearing assembly 20, the non-rotating lower mount 22c of the lower seal assembly and the rotating liner 100. The dynamic seal 22b is preferably a fiber ring, the primary purpose of which is to exclude sand and other abrasive materials.

The bottom seal assembly 22 further provides environmental protection by preventing accidental spillage outside of the bottom seal assembly 22. Bearing assembly 20 includes two high pressure lip seals at 20b and a third high pressure lip seal at 20g. The dynamic seal 22b prevents spillage in the event of the sudden failure of the high pressure lip seals at 20b and 20g by providing a seal between the bottom seal assembly 22 and the interior 12.

The high pressure lip seals at 20b and 20g included in bearing assembly 20 operate as high pressure seals between liner 100 and bearing mount 20a in the first instance and between cup 20f and the articulated seal 10. Tapered bearings 20c are contained within bearing chamber 20d. Bearing chamber 20d includes oil port 20e for introducing and/or observing lubricant levels with the bearing chamber 20d. The pressure in the chamber 20d may be monitored by means of the port 20e for indications of wear or failure of the seals at 20b.

The upper seal assembly 18 provides a high static pressure seal between the rotating polished rod and the exterior 12a. The upper seal packing assembly includes a sealing ring 18a biased against the upper element 10a by top cap 18b.

In another embodiment, shown in FIG. 5, the seal system is incorporated into a non-rotating packing assembly wherein the seal system 10 provides a seal between the interior 12 and exterior 12a of the well while absorbing wobble from a rotating polished rod 50. In this embodiment, primary seals are provided by upper and lower packing elements 52a, 52b within packing body 54. Packing nut 56 applies a pressure against the upper and lower packing 52a, 52b so as to squeeze the packing 52a, 52b against the packing body 54 and polished rod 50 to seal between the interior 12 and exterior 12a.

A lantern spacer 58 may be provided between upper and lower packing 52a, 52b.

The lower packing elements 52b are retained against an inwardly projecting flange 54a of the packing body 54.

In order to absorb vibration as a result of wobble in the rotating polished rod 50, packing body 54 includes an outwardly projecting flange 54b retained in upper and lower seal elements 10a, 10b.

Lower seal element 10b is rigidly connected to a wellhead frame 60 through an appropriate connector system such as threaded connectors. An o-ring 60a will preferably provide a seal between the wellhead frame 60 and lower seal element 10b. As in the other embodiments, the geometry of the outwardly projecting flange 54b and the upper and lower seal elements 10a, 10b define a tortuous path for retaining an elastomeric sealing element 14. As such, the packing body 54 "floats" within upper and lower seal elements 10a, 10b such that rotational wobble from the polished rod 50 is absorbed by the sealing element 14 and provides a seal between the packing body 54 and upper and lower seal elements 10a, 10b in the manner bed above.

The seal assembly 16 has been tested to 1500 psi at 740 rpm without failure. The typical operating pressure within a well 12 is less than 500 psi.

The above-described embodiments of the invention are intended to be examples of the present invention. Alterations, modifications and variations may be effected invention. the particular embodiments by those of skill in the art, without departing from the scope of the

What is claimed is:

1. An articulated seal system comprising:
  upper and lower seal supporting elements, the upper and lower seal supporting elements having respective overlapping flanges, the overlapping flanges defining a void; and
  a resiliently flexible seal within the void.

2. An articulated seal system as in claim 1 wherein any one of the upper or lower seal supporting elements includes two sections, each section adapted for allowing assembly of the upper and lower seal supporting elements with respect to each other.

3. An articulated seal system as in claim 1 wherein the overlapping flanges define an s-shaped void.

4. An articulated seal as in claim 1 wherein each of the upper and lower seal supporting elements have two or more overlapping flanges.

5. An articulated seal system as in claim 1 wherein the overlapping flanges define curved surfaces.

6. An articulated seal as in claim 1 wherein the seal is bonded to the upper and lower seal supporting elements.

7. An articulated seal as in claim 1 wherein the seal is compression molded into the void.

8. An articulated seal as in claim 1 wherein the upper and lower seal supporting elements include a mating flange and recess adjacent the void for retaining an uncured elastomer within the void during curing of the elastomer to form the flexible seal and for preventing uncured elastomer from seeping between the upper and lower seal supporting elements when the upper and lower seal supporting elements are marginally separated from one another.

9. A method of assembling an articulated seal system having upper and lower seal supporting elements having respective overlapping flanges, the overlapping flanges defining a void, comprising the steps of:
  (a) inserting the overlapping flange of either of the upper or lower seal supporting elements into to the overlapping flange of the opposing element;
  (b) stabilizing the upper and lower seal supporting elements with respect to one another; and,
  (c) injecting an un-cured sealing agent into the void and allowing the sealing agent to cure.

10. An articulated seal system for sealing between the interior and exterior of a well comprising:
  a lower seal supporting element having an inwardly projecting flange;
  an upper seal supporting element having an outwardly projecting flange overlapping with the inwardly projecting flange wherein the inwardly and outwardly projecting flanges define an s-shaped void having curved surfaces between the interior and exterior of the articulated seal system; and,
  a resiliently flexible seal bonded to the curved surfaces of the void.

11. An articulated seal system as in claim 10 wherein the lower seal supporting element includes a base element and a cap element for selective attachment to the base element, wherein the cap element includes the inwardly projecting flange.

12. A seal assembly for use at a wellhead, the wellhead having a rotating drivehead operatively connected to a rotating inner sleeve and a polished rod, the seal assembly comprising:
  a lower seal assembly for sealing between the rotating inner sleeve and a stationary mount;
  a bearing assembly operatively connected between the rotating inner sleeve and the stationary mount;
  an articulated seal operatively connected to the rotating inner sleeve, the articulated seal having upper and lower seal supporting elements, the upper and lower seal supporting elements having respective overlapping flanges, the overlapping flanges defining a void; and a resiliently flexible seal within the void; and,
  a top seal assembly for sealing between the polished rod and the exterior of the wellhead.

13. A seal assembly as in claim 12 wherein the top seal assembly includes a fibre packing seal for protecting the lower seal assembly from sand and other abrasive materials.

14. A seal assembly for use at a wellhead, the wellhead having a packing assembly for sealing between a non-rotating wellhead and a rotating polished rod, the seal assembly comprising:
  at least one of an upper and lower seal assembly for sealing between the rotating polished rod and a packing body;
  the packing body having an outwardly projecting flange; and an articulated seal operatively connected to the packing body, the articulated seal having upper and lower seal supporting elements, the upper and lower seal supporting elements having respective inwardly projecting flanges overlapping with the outwardly projecting flange, the outwardly projecting flange and overlapping flanges defining a void; and a resiliently flexible seal within the void.

* * * * *